E. T. PRINDLE.

Cutting Tool for Planing Machines.

No. 9,738. Reissued June 7, 1881.

Witnesses:
F. L. Durand
H. Aubrey Toulmin

Inventor:
E. T. Prindle
by John J. Halstat
his Atty.

UNITED STATES PATENT OFFICE.

EDWARD T. PRINDLE, OF AURORA, ILLINOIS.

CUTTING-TOOL FOR PLANING-MACHINES.

SPECIFICATION forming part of Reissued Letters Patent No. 9,738, dated June 7, 1881.

Original No. 77,211, dated April 28, 1868. Application for reissue filed May 10, 1881.

*To all whom it may concern:*

Be it known that I, EDWARD T. PRINDLE, of Aurora, in the county of Kane and State of Illinois, have invented a new and useful Improvement in Cutting-Tools for Planing and Slotting Machines; and I do hereby declare that the following is a full, clear, and exact description thereof, reference being had to the accompanying drawings, making a part of this specification, in which—

Figure 1:
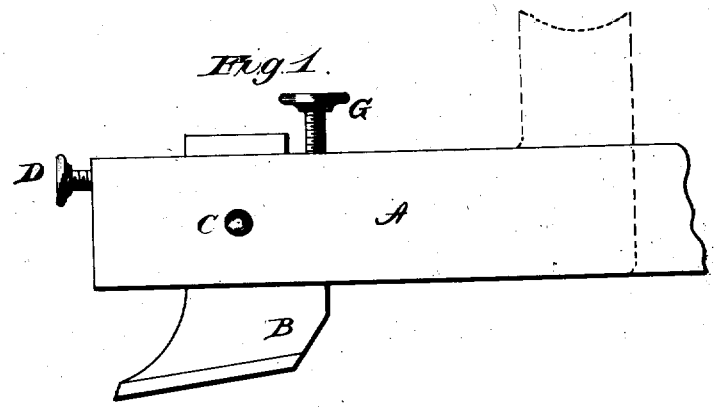
Figure 2:
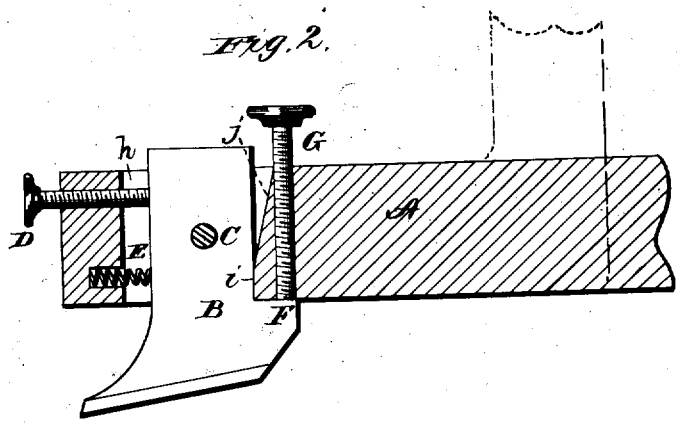

Figure 1 is a side elevation, and Fig. 2 a longitudinal section.

The nature of this invention consists, first, in substituting for the tools ordinarily used upon planing and slotting machines one in which the cutting part is easily detached and others substituted without removal from the tool-post; second, in so constructing the cutter that while firmly held in place during the forward or cutting stroke its cutting point or edge may rise and pass over the work while moving backward, thereby avoiding injury to such cutting point or edge by being dragged; third, in relieving the pin upon which the cutter turns of all strain by the use of a shoulder upon the back of the cutter and a set-screw in the end of the shank; fourth, in providing means whereby the cutters can be so adjusted as to bring them in contact with the work at any angle desired; fifth, in its adaptation to any planing or slotting machine without alteration of the tool-post; sixth, in the use of a spring so arranged that while allowing the cutter to rise by being drawn backward over the work it presses it firmly into place as soon as released.

In the annexed drawings, A represents the shank, made of ordinary square or oblong tool-steel, for holding the cutters, and it is fastened in the tool-post in the usual manner.

B represents the cutter, passing through a slot, *h*, near the end of the shank A, and turning upon the pin C. This slot has a rear wall, *i*, such that the cutter B shall, when in use, abut and bear directly against it, and the upper part, *j*, of this rear wall, as shown, recedes or is cut away to permit the cutter to rock on its pin, and thus allow its cutting point or edge, during the return or backward movement, to rise and pass freely over the work, as above stated.

D represents a set-screw passing through the end of the shank A and pressing upon the cutter B, and operating, in connection with the shoulder F, to prevent strain or injury to the pin C.

E represents the spring that holds the cutter in place.

G represents a set-screw bearing upon the cutter at F, for the purpose of adjusting it to any desired angle.

The principal advantages that my invention possesses over other constructions are that it can be used upon planing or slotting machines without alteration of the tool-post; that it is stronger and less liable to get out of order, and that the cutters can be readily adjusted so as to present the edge or point at the proper angle.

What I claim as my invention, and desire to secure by Letters Patent, is—

1. In a cutting-tool, a cutter hung upon and adapted to turn on a pin in a slot made in a tool-shank, A, such slot having a face or wall, *i*, against which the tool may abut when in cutting action, and having a receding or inclined face, *j*, to allow the cutter on the return motion to swing back to lift its cutting edge or point.

2. In combination, a shank, A, slotted as shown and described, a cutter hung on a pin and adapted to turn thereon in such slot, and a reacting spring which, while permitting the cutter to swing and rise on the return movement, serves to press it back to its working position when released.

3. The cutting-tool composed of the shank A, cutter B, with the shoulder F, and set-screws D and G, when constructed in the manner and for the purpose substantially as herein specified.

EDWARD T. PRINDLE.

Witnesses:

M. O. SOUTHWORTH,

A. J. KING.